United States Patent [19]

Mermal et al.

[11] 4,178,711

[45] Dec. 18, 1979

[54] METHOD FOR USE IN HARVESTING EARTHWORMS

[76] Inventors: Howard J. Mermal, 4045 S. Pine Ave.; Gary A. Mermal, 4060 S. Taylor Ave.; Donald J. Mermal, 4409 S. Pine Ave.; Robert M. Mermal, 4045 S. Pine Ave., all of Milwaukee, Wis. 53207

[21] Appl. No.: 863,571

[22] Filed: Dec. 22, 1977

[51] Int. Cl.² ............................................. A01K 97/00
[52] U.S. Cl. ................................................. 43/1; 43/4
[58] Field of Search .................... 43/1, 4; 119/1, 15; 424/195, 74; 51/320, 394

[56] References Cited

U.S. PATENT DOCUMENTS

| 152,534 | 6/1874 | Ulmer | 424/195 |
|---|---|---|---|
| 606,723 | 7/1898 | Koorie | 424/74 |
| 1,446,914 | 2/1923 | Lingafelter | 43/1 |
| 2,421,806 | 6/1947 | Perry | 51/320 |
| 3,239,413 | 3/1966 | Chaney | 43/1 |
| 3,436,785 | 4/1969 | Kantor | 51/394 |

OTHER PUBLICATIONS

Auyong, T. K. et al, "Pharmacological Aspects of Juglone", *Toxicon*, vol. 1, pp. 235–239, 1963.

*Primary Examiner*—Nicholas P. Godici

[57] ABSTRACT

A method for causing earthworms to come out of the ground so that they can be readily harvested, functional when applied to an area of ground to cause the earthworms in the soil to come out of the soil so that they can be harvested.

4 Claims, No Drawings

METHOD FOR USE IN HARVESTING EARTHWORMS

BACKGROUND OF THE INVENTION

1. Field of the Invention

The present invention relates to a composition to be applied to a lawn or soil and for causing earth worms to readily come out of the ground so that they can be easily harvested. The invention also relates to a method for making such a composition.

2. Description of the Prior Art

Earthworms are commonly used by fishermen as live bait. Accordingly, it is desireable to have a convenient means to permit earthworms to be extracted from lawns or other soil.

One previously developed method for causing earthworms to come out of the ground to permit them to be picked up employs the use of an electrically charged rod. Such rods are used to apply a current to a localized area of ground and may be functional to cause worms to come out of the ground in that localized area. However, use of such electrified rods frequently damages or kills the earthworms driven out of the ground. Furthermore, such electric rods are expensive and require means for attachment to an electrical outlet.

Digging or tilling the earth to obtain earthworms is also unsatisfactory because it is labor intensive and time consuming. Furthermore, digging is only possible in areas where damage to a lawn or the like is not a consideration.

Another prior method of gathering worms has been to pour large amounts of water on an area of ground at night and then search for worms coming to the surface. This method requires the use of relatively large quantities of water and can be performed only at night.

SUMMARY OF THE INVENTION

The present invention provides an improved method for causing earthworms to come out of the ground so that they can be readily picked up and also provides a composition functional when applied to an area of ground to cause the earthworms in the soil to come out of soil so that they can be harvested.

The composition of the present invention is generally comprised of a liquid formed either directly or indirectly by mixing the husks of black walnuts with water. A small quantity of this liquid, when applied to the surface of a lawn or soil will cause earthworms in the soil to come out of the soil nearly immediately so that they can be readily gathered. Using this composition the worms are not damaged. Furthermore, only a small quantity of the liquid need be applied to the surface of the soil.

The composition of the present invention is particularly useful to fishermen, for example, in that it provides an easy, convenient means for gathering fishing worms, and it can be employed during the daylight hours or at night. Further, only a small quantity of the composition is required to obtain an adequate number of worms for fishing, and the composition can be formed by mixing water with the walnut husks immediately before it is to be used. Accordingly it may be necessary that the fisherman transport only a container having walnut husks therein. Furthermore, the composition when applied to soil causes earthworms to come to the surface in a very short period of time. For example, if the soil is at room temperature, earthworms near the surface of the soil will generally come to the surface of the soil within one minute of application of the composition.

A further advantage of the composition is that it does not damage the vegetation where it is applied not have any lasting effects. After a short period of time, earthworms having been brought to the surface of the soil by application of the composition will return to that soil.

An additional advantage of the method and composition of the invention is that any earthworms caused to come to the surface of the soil by application of the composition tend to come completely out of the soil and are not damaged when picked up.

Before explaining the invention in more detail it is to be understood that the invention is not limited in its application to the details of composition and the specific method steps or sequence of method steps defined in the following description of preferred embodiments. The invention is capable of other embodiments and of being practiced and carried out in various ways.

DESCRIPTION OF THE PREFERRED EMBODIMENTS

The present invention includes a method for causing earthworms to come out of the ground so that they can be harvested, the method including preparing a composition including water and black walnut sheel husks to form a dark colored liquid and distributing this liquid on an area of soil. Such distribution of the liquid on the soil will cause earthworms in the soil to come to the surface of the soil in a manner facilitating convenient harvesting of the earthworms.

In one preferred method, the composition can be produced by filling a container with husks stripped from the shells of mature black walnuts. Water is then added to fill the container and the husks are allowed to soak in the water to form a dark liquid. This liquid can then be distributed on the ground to cause earthworms to come to the surface. It has been found that a pint of such liquid distributed on a 1 sq. ft. area of soil is sufficient to cause earthworms in the soil to come to the surface.

Alternatively, the husks referred to above can be placed in a porous container or porous mesh bag or the like and the porous container disposed in a second container. The second container can then be filled with water at any time it is desired to harvest earthworms. Water in the second container will be mixed with the black walnut husks in the first container to form the desired dark liquid in a short period of time. If desired the walnut husks can be left intact or chopped.

As a further alternative means of providing for convenient use of the composition of the invention, husks of mature walnuts can be disposed in a container such as a bottle having a strainer or screen at its mouth. Water can them be poured into the container at the time of use. The resultant liquid can then be poured on the ground to cause worms in the soil to come to the surface. The strainer in the mouth of the container will prevent escape of the black walnut husks thereby facilitating repeated use.

Alternatively, after the liquid composition is formed by soaking black walnut husks in water, the water can be removed from the liquid by evaporation or the like to form either a concentrated liquid, or a solid if the water is completely removed from the composition. The resulting concentrated liquid or solid can then be mixed with water at the time of its intended use. It will be readily appreciated that in a concentrated or solid form the composition is readily portable and particularly adapted for use by fishermen.

We claim:

1. A method for causing earthworms to come out of soil so that they can be conveniently harvested, the method comprising the steps of forming a liquid composition achieved by mixing husks of walnuts and water and applying said liquid composition to an area of surface of the ground.

2. The method set forth in claim 1 and further including the step of grinding said husks before mixing with water.

3. The method set forth in claim 1 wherein said husks are disposed in a container and means are provided to prevent escape of the husks from the container but to provide for flow of water into the container to mix with the husks and out of the container for application to the ground.

4. A method for causing earthworms in the ground to come to the surface so that they can be easily harvested, the method comprising the steps of forming a composition comprising an aqueous extract of walnut husks and applying said composition to an area of said surface of the ground.

* * * * *